(12) United States Patent
Farhat et al.

(10) Patent No.: US 11,738,799 B2
(45) Date of Patent: Aug. 29, 2023

(54) STEERING SYSTEM WITH MULTIPLE CONTROLLERS

(71) Applicant: Ford Global Technologies, LLC, Dearborn, MI (US)

(72) Inventors: Mohamad Wajih Issam Farhat, Dearborn, MI (US); Steven R. El Aile, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 17/067,870

(22) Filed: Oct. 12, 2020

(65) Prior Publication Data
US 2022/0111888 A1    Apr. 14, 2022

(51) Int. Cl.
B62D 5/04 (2006.01)

(52) U.S. Cl.
CPC ......... B62D 5/0484 (2013.01); B62D 5/0463 (2013.01)

(58) Field of Classification Search
CPC .. B62D 5/0484; B62D 5/0463; B62D 5/0403; B62D 5/046; B62D 5/0496; B62D 5/0493; B62D 5/0457; B60W 10/20; B60W 2510/20; B60W 2710/202
See application file for complete search history.

(56) References Cited

U.S. PATENT DOCUMENTS

| 2005/0159866 A1* | 7/2005 | Takeuchi | B62D 5/003 180/443 |
| 2006/0042858 A1 | 3/2006 | Boyle et al. | |
| 2009/0057050 A1* | 3/2009 | Shiino | B62D 7/18 180/444 |
| 2018/0273005 A1* | 9/2018 | Redder | B60T 8/885 |
| 2019/0326843 A1* | 10/2019 | Kawai | B62D 5/0484 |
| 2019/0382045 A1* | 12/2019 | Sachs | G07C 5/085 |
| 2020/0047764 A1* | 2/2020 | Yamashita | B60W 30/18145 |
| 2020/0076343 A1* | 3/2020 | Zhang | B62D 5/0463 |
| 2020/0307683 A1* | 10/2020 | Fujita | H02P 6/16 |

FOREIGN PATENT DOCUMENTS

| CN | 106020078 B | 8/2018 |
| CN | 109917779 A | 6/2019 |
| CN | 209852413 U | 12/2019 |
| DE | 102018108597 A1 | 9/2019 |

* cited by examiner

*Primary Examiner* — Minnah L Seoh
*Assistant Examiner* — Michael R Stabley
(74) *Attorney, Agent, or Firm* — Lorne Forsythe; Bejin Bieneman PLC

(57) ABSTRACT

A system includes a steering-system motor, a first electronic control unit (ECU) and a second ECU each electrically connected to the steering-system motor, a communication line directly communicatively connecting the first ECU and the second ECU, and a gateway module communicatively connecting the first ECU to a controller area network (CAN) bus and communicatively connecting the second ECU to the CAN bus. The first ECU is programmed to, upon detecting a fault, transmit a fault code to the second ECU via the communication line and via the gateway module. The second ECU is programmed to, upon detecting a fault, transmit a fault code to the first ECU via the communication line and via the gateway module.

17 Claims, 3 Drawing Sheets

STEERING SYSTEM WITH MULTIPLE CONTROLLERS

BACKGROUND

A steering system for a vehicle controls the turning of the wheels. Types of steering systems include rack-and-pinion systems, often with electric power-assisted steering; other mechanical arrangements; and steer-by-wire systems. The steering system typically includes an electronic control unit (ECU) that is in communication with and receives input from a controller and/or a human driver. The human driver typically controls the steering system via a steering wheel.

DETAILED DESCRIPTION

Figure 1:
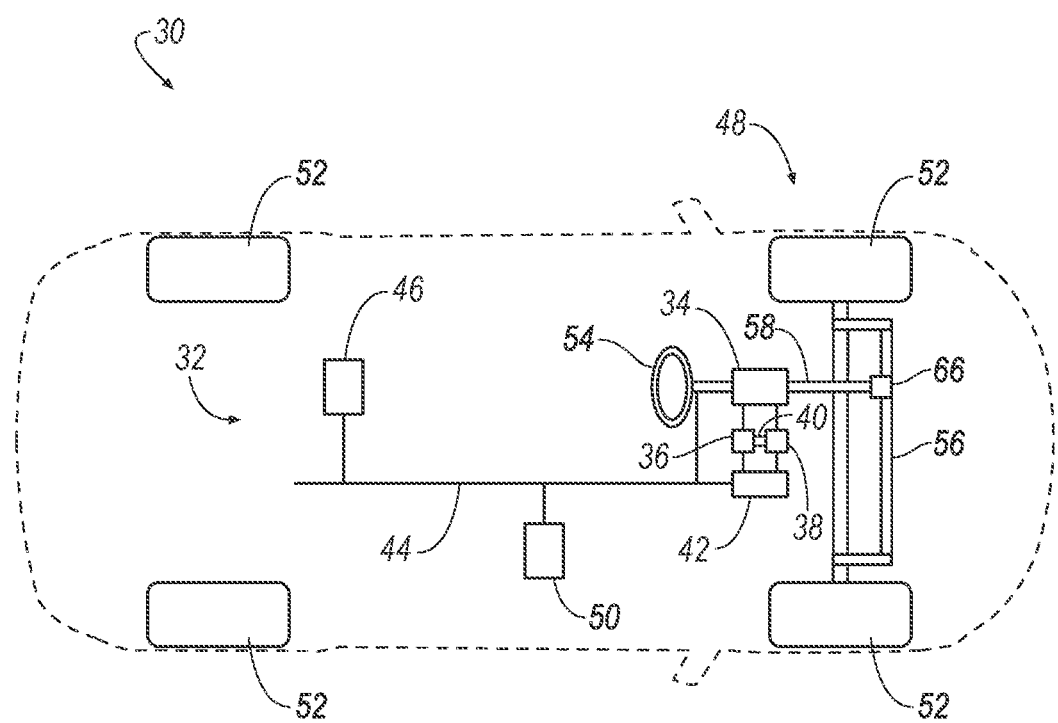
FIG. 1 is a diagram of an example steering system in a vehicle.

A system includes a steering-system motor, a first electronic control unit (ECU) and a second ECU each electrically connected to the steering-system motor, a communication line directly communicatively connecting the first ECU and the second ECU, and a gateway module communicatively connecting the first ECU to a controller area network (CAN) bus and communicatively connecting the second ECU to the CAN bus. The first ECU is programmed to, upon detecting a fault, transmit a fault code to the second ECU via the communication line and via the gateway module. The second ECU is programmed to, upon detecting a fault, transmit a fault code to the first ECU via the communication line and via the gateway module.

The first ECU may be programmed to, upon determining a desired torque value, provide one-half of the desired torque value to the steering-system motor upon determining that both ECUs have a full performance capability. The second ECU may be programmed to, upon determining a desired torque value, provide one-half of the desired torque value to the steering-system motor upon determining that both ECUs have a full performance capability.

A fault code from one of the first or second ECUs may indicate that that ECU has a reduced performance capability. The first ECU may be further programmed to provide more than one-half of the desired torque value to the steering-system motor upon determining that the second ECU has a reduced performance capability. The first ECU may be further programmed to calculate a torque-scaling value for the first ECU, and provide the torque-scaling value multiplied by the desired torque value to the steering-system motor upon determining that the second ECU has a reduced performance capability, and the torque-scaling value may compensate for the reduced performance capability of the second ECU. The torque-scaling value may have a maximum value of 1.

The torque-scaling value may equal a difference of 1 and a product of one-half and the reduced performance capability of the second ECU, divided by the performance capability of the first ECU.

The second ECU may be further programmed to provide more than one-half of the desired torque value to the steering-system motor upon determining that the first ECU has a reduced performance capability.

A temperature of the second ECU above a temperature threshold may indicate a reduced performance capability.

A maximum voltage from a terminal of the second ECU below a voltage threshold may indicate a reduced performance capability.

The steering-system motor may be a six-phase electric motor. The first ECU may be electrically connected to a set of three coil pairs of the steering-system motor, and the second ECU may be electrically connected to a set of the other three coil pairs of the steering-system motor.

The steering-system motor may be a steer-by-wire torque actuator.

The steering-system motor may be an electric power-assist steering motor.

The communication line may be an intermicrocommunications line.

With reference to the Figures, a system 32 for a vehicle 30 includes a steering-system motor 34, a first electronic control unit (ECU) 36 and a second ECU 38 each electrically connected to the steering-system motor 34, a communication line 40 directly communicatively connecting the first ECU 36 and the second ECU 38, and a gateway module 42 communicatively connecting the first ECU 36 to a controller area network (CAN) bus 44 and communicatively connecting the second ECU 38 to the CAN bus 44. The first ECU 36 is programmed to, upon detecting a fault, transmit a fault code to the second ECU 38 via the communication line 40 and via the gateway module 42. The second ECU 38 is programmed to, upon detecting a fault, transmit a fault code to the first ECU 36 via the communication line 40 and via the gateway module 42.

The system 32 provides redundancy for steering the vehicle 30, and the vehicle 30 may be able to continue steering even if either the first ECU 36 or the second ECU 38 fails or has a reduced performance capability. The system 32, as described below, can compensate for the failure of one of the ECUs 36, 38 by increasing the output of the other of the ECUs 36, 38, which can minimize understeer in the event of the failure of one of the ECUs 36, 38. The system 32 provides redundant communication between the ECUs 36, 38 by the communication line 40 and the gateway module 42, helping the foregoing benefits occur even when communications method is interrupted.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle or a conventional vehicle with only manual driving controls. A vehicle computer 46 can be programmed to operate the vehicle 30 independently of the intervention of a human driver, completely or to a lesser degree. The vehicle computer 46 may be programmed to operate a propulsion, a brake system, a steering system 48, and/or other vehicle systems. For the purposes of this disclosure, autonomous operation means the vehicle computer 46 controls the propulsion, brake system, and steering system 48 without input from a human driver; semi-autonomous operation means the vehicle computer 46 controls one or two of the propulsion, brake system, and steering system 48 and a human driver controls the remainder; and nonautonomous operation means a human driver controls the propulsion, brake system, and steering system 48.

The vehicle computer 46 is a microprocessor-based computer. The vehicle computer 46 includes a processor, memory, etc. The memory of the vehicle computer 46 includes memory for storing instructions executable by the processor as well as for electronically storing data and/or databases.

The vehicle computer 46 may transmit and receive data through the CAN bus 44. The vehicle computer 46 may be communicatively coupled to the gateway module 42, steering sensors 50, and other components via the CAN bus 44. The other components can be connected to the CAN bus 44 via Ethernet, WiFi, Local Interconnect Network (LIN), onboard diagnostics connector (OBD-II), and/or by any other wired or wireless communications network (not shown), which are connected to the CAN bus 44 and to each other via the gateway module 42.

The gateway module 42 is a control module that connects and transmits data between buses of different domains in the vehicle 30, e.g., the CAN bus 44, Ethernet, LIN, OBD-II, etc. The first ECU 36 and the second ECU 38 are communicatively connected to the CAN bus 44 through the gateway module 42. For example, the first ECU 36 and the second ECU 38 are directly communicatively connected to the gateway module 42.

The steering system 48 is typically a conventional vehicle steering subsystem and controls the turning of road wheels 52. The steering system 48 may be a rack-and-pinion system with electric power-assisted steering, a steer-by-wire system, or any other suitable system. The steering system 48 includes the first and second ECUs 36, 38 that are in communication with and receive input from the vehicle computer 46 and/or a human driver, as well as the steering sensors 50. The human driver may control the steering system 48 via, e.g., a steering wheel 54, handheld remote control (not shown), etc.

The steering system 48 may be a conventional rack-and-pinion steering system. Alternatively or additionally, the steering system 48 may be a Pitman-arm system, a rear-steer system, etc. (not shown). A steering rack 56 may be turnably coupled to the road wheels 52, for example, in a four-bar linkage. The position of the steering rack 56 determines the turning of the road wheels 52. Translational motion of the steering rack 56 results in turning of the road wheels 52. A steering column 58 may be coupled to the steering rack 56 via a rack and pinion 60, that is, gear meshing between a pinion gear and a rack gear (not specifically shown).

The steering column 58 transfers rotation of the steering wheel 54 to movement of the steering rack 56. The steering column 58 may be, e.g., a shaft connecting the steering wheel 54 to the steering rack 56. The steering column 58 may house a clutch and one or more of the steering sensors 50 such as a torque sensor (not specifically shown).

The steering wheel 54 allows an operator to steer the vehicle 30 by transmitting rotation of the steering wheel 54 to movement of the steering rack 56. The steering wheel 54 may be, e.g., a rigid ring fixedly attached to the steering column 58.

The first and second ECUs 36, 38 are microprocessor-based computing devices, e.g., generic computing devices each including a processor and a memory, electronic controllers or the like, field-programmable gate arrays (FPGA), application-specific integrated circuits (ASIC), etc. The ECUs 36, 38 can each include a processor, memory, etc. The memories of the ECUs 36, 38 each include memory for storing instructions executable by the processor as well as for electronically storing data and/or databases, and/or the ECUs 36, 38 can include structures such as the foregoing by which programming is provided. The ECUs 36, 38 can be, e.g., power-steering control modules.

The steering-system motor 34 is coupled to the steering system 48, e.g., the steering column 58, so as to cause turning of the road wheels 52. For example, the steering-system motor 34 may be an electric motor rotatably coupled to the steering column 58, that is, coupled so as to be able to apply a steering torque to the steering column 58. The steering-system motor 34 may provide power assist to the steering system 48. In other words, the steering-system motor 34 may provide torque in a direction in which the steering wheel 54 is being rotated by a human driver, allowing the driver to turn the steering wheel 54 with less effort. The steering-system motor 34 may be an electric power-assist steering motor.

Alternatively to the rack-and-pinion steering system, the steering system 48 may be a steer-by-wire steering system, i.e., may have a gap in mechanical linkages between the steering wheel 54 and the road wheels 52. If the vehicle 30 is a fully autonomous vehicle, the steering system 48 may be a steer-by-wire steering system lacking the steering wheel 54 and the steering column 58. The vehicle computer 46 and/or the ECUs 36, 38 may receive signals from the steering sensors 50, e.g., a position sensor positioned to detect the orientation of the steering wheel 54 (not specifically shown). The position sensor may be, e.g., a Hall effect sensor, a rotary encoder, etc. The vehicle computer 46 may output signals to the steering-system motor 34 via the first and second ECUs 36, 38, or the ECUs 36, 38 may output the signals directly to the steering-system motor 34. The steering-system motor 34 may transform the signals into mechanical motion of the steering rack 56. The steering-system motor 34 may be a steer-by-wire torque actuator. The steering-system motor 34 may be one or more electromechanical actuators coupled to the steering rack 56 in lieu of or via the rack and pinion 60.

The steering sensors 50 provide data about components of the steering system 48. For example, the steering sensors 50 include wheel-speed sensors for the road wheels 52; position sensors on components of the steering system 48 such as the steering wheel 54, the steering column 58, the rack and pinion 60, or the steering rack 56; torque sensors on components of the steering system 48 such as the steering column 58, the rack and pinion 60, or the steering-system motor 34; and/or electrical sensors such as voltmeters, etc. for electrical connections of the steering system 48 such as outputs of the first and second ECUs 36, 38.

Figure 2:
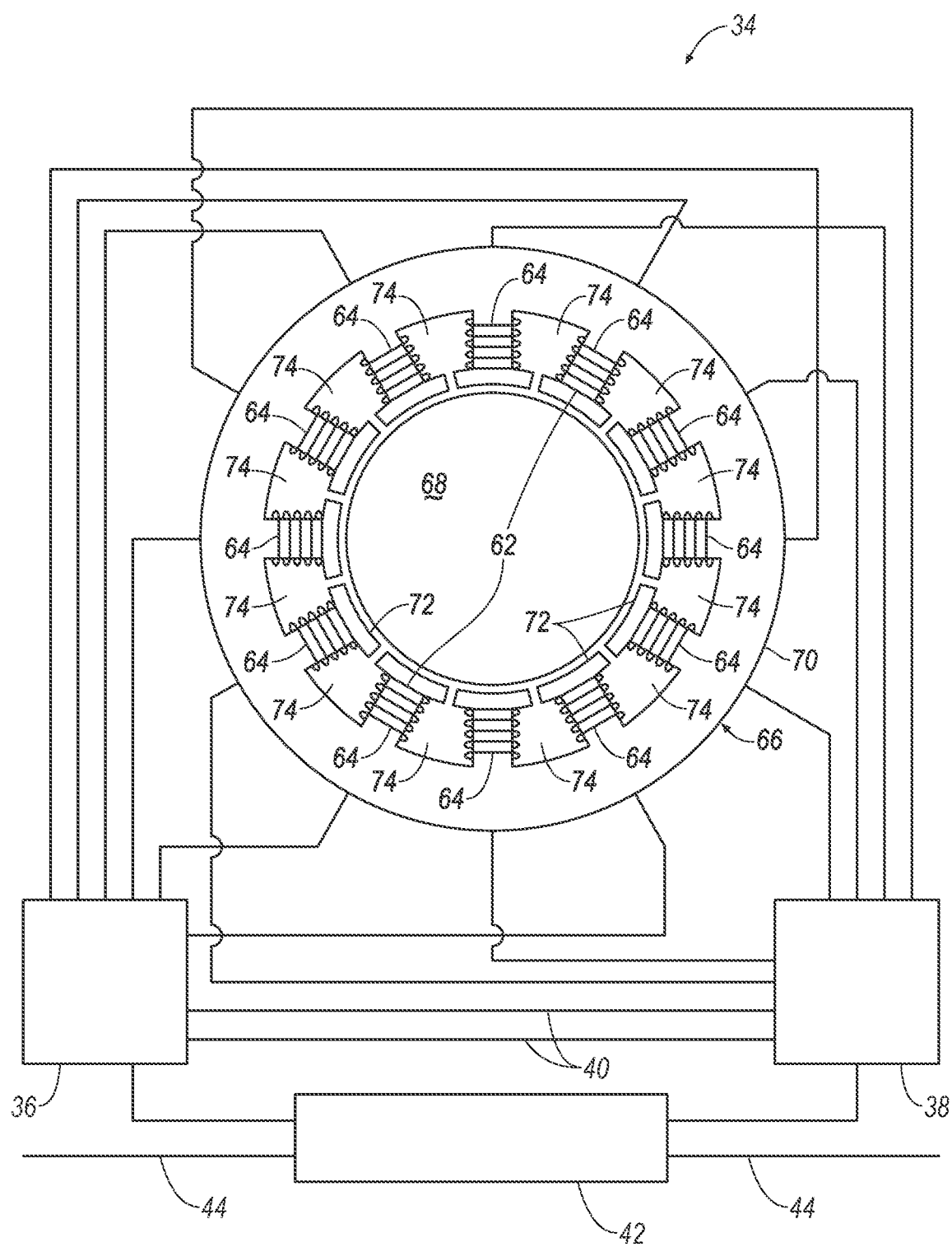
FIG. 2 is a diagram of a portion of the steering system of FIG. 1.

With reference to FIG. 2, the steering-system motor 34 may be a six-phase electric motor, i.e., may have six coil pairs 62, i.e., twelve coils 64. The steering-system motor 34 includes a stator 66 that is stationary and a rotor 68 that can rotate relative to the stator 66. The stator 66 includes a stator core 70 with poles 72 separated by slots 74, and the coils 64 wound around the poles 72 and through the slots 74. Each coil 64 is several loops of wiring wrapped around one of the poles 72. The coils 64 are evenly spaced about an axis of rotation of the rotor 68. Each coils pair 62 includes two coils 64 positioned directly opposite each other relative to the rotor 68.

The first and second ECUs 36, 38 are each electrically connected to the steering-system motor 34. The first ECU 36 may be electrically connected to a first set of three coil pairs 62 of the steering-system motor 34. The second ECU 38 may be electrically connected to a second set of three coil pairs 62 of the steering-system motor 34. The second set of three coil pairs 62 includes the other three coil pairs 62 than those included in the first set of coil pairs 62, i.e., the three coil pairs 62 not included in the first set of coil pairs 62. In other words, the first and second sets of coil pairs 62 are mutually exclusive and exhaustive of the coil pairs 62. The first set of coil pairs 62 and the second set of coil pairs 62 alternate; in other words, each coils pair 62 in the first set is circumferentially adjacent to two coil pairs 62 in the second set, and vice versa.

When a signal is sent from both the first ECU 36 and the second ECU 38, the steering-system motor 34 operates as a six-phase electric motor. When a signal is sent from only the first ECU 36 or only the second ECU 38, the steering-system motor 34 operates as a three-phase electric motor, with either the first set or the second set of coil pairs 62 active, and the other of the first set or the second set of coil pairs 62 inert.

In normal operation, the vehicle computer 46 may transmit a torque signal to the first and second ECUs 36, 38. For the purpose of this disclosure, a "torque signal" is an electrical transmission defining a desired torque value to be generated by a motor, e.g., the steering-system motor 34. For the purpose of this disclosure, a "desired torque value" is a value of torque to be generated by a motor, e.g., the steering-system motor 34, based on a planned maneuver generated by the vehicle computer 46, a steering-wheel angle of the steering wheel 54, etc. The torque signal includes information that, given a particular motor, maps onto a torque to be generated by that motor; for example, the torque signal may have a voltage that will cause the steering-system motor 34 to generate the torque, or the torque signal may have a value for torque encoded digitally.

The first and second ECUs 36, 38 transmit first and second output signals to the first and second set of coil pairs 62, respectively, upon determining the desired torque value. The ECUs 36, 38 can determine the desired torque value by, e.g., receiving the torque signal containing the desired torque value from the vehicle computer 46, or, alternatively, by calculating the desired torque value based on data received from the steering sensors 50, e.g., the steering-wheel angle of the steering wheel 54. The output signals specify torque values to be generated by the respective sets of coil pairs 62. The output signals may each have a voltage that maps onto the torque generated by the respective set of coil pairs 62. The output signals have values that are each a fraction of the desired torque value received or determined by the first and second ECUs 36, 38, e.g., half of the desired torque value.

The communication line 40 directly communicatively connects the first ECU 36 and the second ECU 38. For the purposes of this disclosure, "directly communicatively connect" means connecting without intermediate components. For example, the communication line 40 extends from a pin of the first ECU 36 to a pin of the second ECU 38. The communication line 40 is not directly connected to the gateway module 42 or the CAN bus 44. The communication line 40 can be an intermicrocommunications line.

Figure 3:
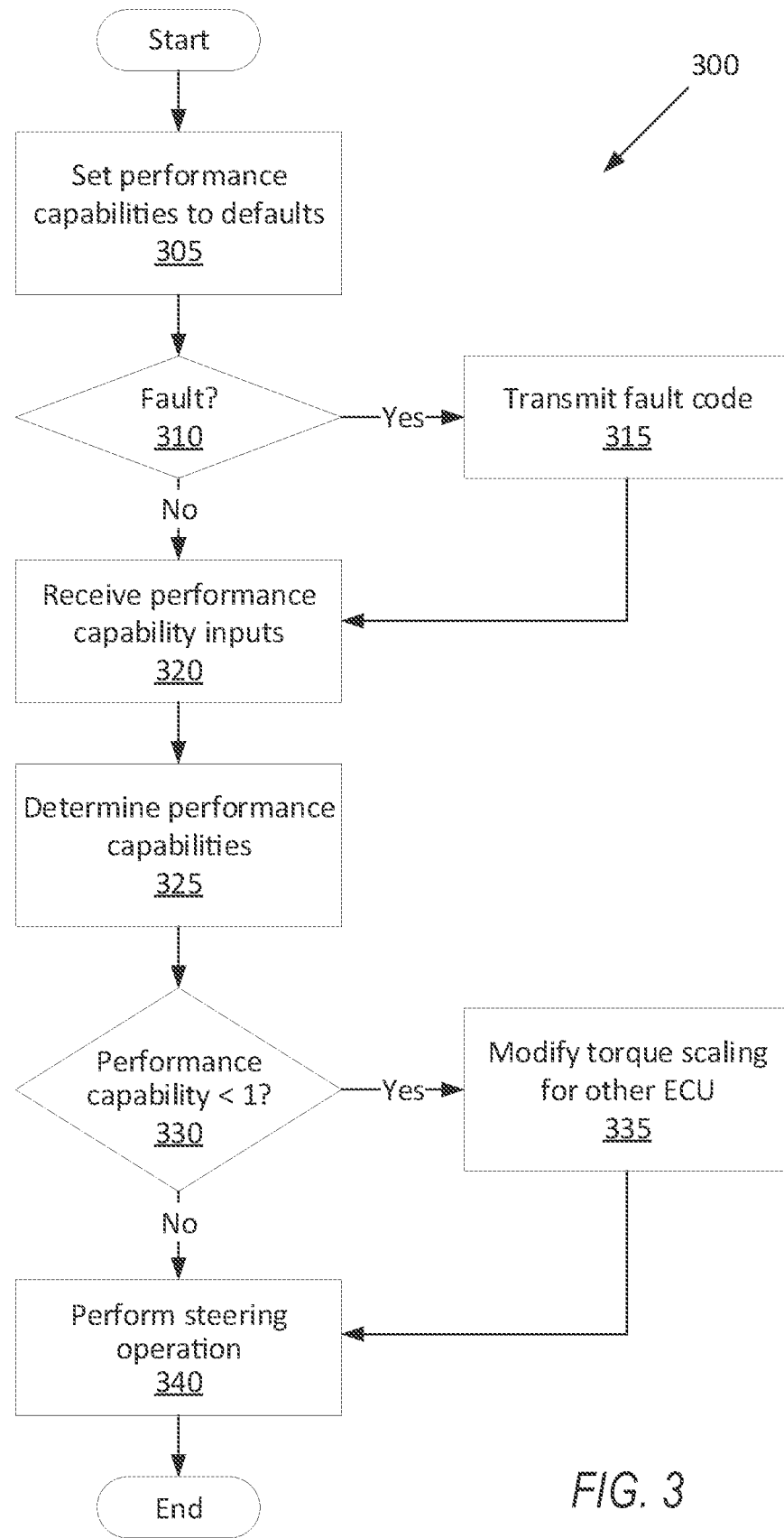
FIG. 3 is a process flow diagram of an example process for controlling the steering system.

FIG. 3 is a process flow diagram illustrating an exemplary process 300 for controlling the steering system 48. The memories of the ECUs 36, 38 store executable instructions for performing the steps of the process 300 and/or programming can be implemented in structures such as mentioned above. In general, the first ECU 36 is programmed to transmit a fault code to the second ECU 38 via the communication line 40 and via the gateway module 42 upon detecting a fault, to provide one-half of the desired torque value from the first ECU 36 to the steering-system motor 34 upon determining that the second ECU 38 has a full performance capability, and to provide more than one-half of the desired torque value from the first ECU 36 to the steering-system motor 34 upon determining that the second ECU 38 has a reduced performance capability. Note that the first and second ECUs 36, 38 are symmetrical, and that the first and second ECUs 36, 38 can be reversed throughout the process 300. The first ECU 36 and the second ECU 38 perform the process 300 simultaneously.

The process 300 begins in a block 305, in which the first ECU 36 sets performance capabilities and torque-scaling values for the first and second ECUs 36, 38 to default values. For the purposes of this disclosure, a "performance capability" is defined as an estimated fraction of a maximum output of a component that the component can currently output. The default values of the performance capabilities for the first and second ECUs 36, 38 may each be 1, i.e., 100%. The torque-scaling values are multipliers for converting the desired torque value to the output signals from the first and second ECUs 36, 38. The default values of the torque-scaling values for the first and second ECUs 36, 38 may each be 0.5, i.e., each of the first and second ECUs 36, 38 may generate an output signal with a torque value equal to half the desired torque value, e.g., the desired torque value has a value of 5 Newton-meters (N-m), and the output signals each have a value of 2.5 N-m. The default values may be prestored in the memory of the first ECU 36.

Next, in a decision block 310, the first ECU 36 determines whether a fault has occurred. For the purposes of this disclosure, a "fault" is a malfunction occurring in a computer or controller. A fault can be indicated by a difference between an expected output and an actual output, e.g., an incorrect checksum, a failure to generate an output, etc. Upon detecting a fault, the process 300 proceeds to a block 315. Upon not detecting any faults, the process 300 proceeds to a block 320.

In the block 315, the first ECU 36 transmits a fault code to the second ECU 38. The fault code is a string in which a type of the fault is encoded, e.g., a diagnostic trouble code (DTC). The fault code indicates that the first ECU 36 has a reduced performance capability. The first ECU 36 transmits the fault code via the communication line 40 and via the gateway module 42. Transmitting the fault code via both the communication line 40 and the gateway module 42 increases a likelihood that the second ECU 38 receives the fault code. Sending the fault code to the gateway module 42 also provides the fault code to other components of the vehicle 30, such as an OBD-II port for a technician. After the block 315, the process 300 proceeds to the block 320.

In the block 320, the first ECU 36 receives data from the steering sensors 50. The data may include data indicative of a reduced performance capability for the second ECU 38. For example, the data may include a temperature of the second ECU 38, a voltage at a terminal of the second ECU 38, a speed of the vehicle 30, friction within the steering system 48 as indicated by sluggish movement of components of the steering system 48, a fault code from the second ECU 38, etc. The second ECU 38 can send the fault code when the second ECU 38 performs the block 315, and the first ECU 36 can receive the fault code via the communication line 40, via the gateway module 42, or via both the communication line 40 and the gateway module 42.

Next, in a block 325, the first ECU 36 determines the performance capabilities of the first and second ECUs 36, 38. The first ECU 36 may select values for the performance capability from a lookup table based on the data received in the block 320. The conditions, thresholds, and values for the performance capability may be chosen based on testing the torque output of the steering-system motor 34 under different conditions. Here is an example lookup table.

| Condition | Value |
| --- | --- |
| $T > T_{threshold}$ | 0.5 |
| Fault code | 0 |
| $V_{max} < V_{threshold}$ | 0.25 |
| ... | ... |
| None | 1 |

For example, as shown in the table, if the temperature T for the second ECU 38 exceeds a temperature threshold $T_{threshold}$, then the first ECU 36 sets the performance capability for the second ECU 38 to 0.5. If a fault code is received from the second ECU 38, then the first ECU 36 sets the performance capability for the second ECU 38 to 0. If a maximum voltage $V_{max}$ from a terminal of the second ECU 38 is below a voltage threshold $V_{threshold}$, then the first ECU 36 sets the performance capability for the second ECU 38 to 0.25. If more than one condition applies, then the first ECU 36 may set the performance capability to the lowest of the applicable values, or the first ECU 36 may set the performance capability to 0. If no condition applies, the performance capability remains at 1.

Next, in a decision block 330, the first ECU 36 determines whether the second ECU 38 has a reduced performance capability, i.e., has a performance capability less than 1. If the performance capability of the second ECU 38 is less than 1, i.e., if the second ECU 38 has a reduced performance capability, then the process 300 proceeds to a block 335. If the performance capability of the second ECU 38 is equal to 1, i.e., if the second ECU 38 has a full performance capability, then the process 300 proceeds to a block 340.

In the block 335, the first ECU 36 provides more than one-half of the desired torque value to the steering-system motor 34 upon determining the desired torque value. The first ECU 36 calculates a torque-scaling value for the first ECU 36. The torque-scaling value equals a difference of 1 and a product of one-half and the reduced performance capability of the second ECU 38, divided by the performance capability of the first ECU 36, i.e., $TS_1 = (1 - 0.5 * PC_2)/PC_1$, in which $TS_1$ is the torque-scaling value for the first ECU 36, $PC_2$ is the performance capability of the second ECU 38, and $PC_1$ is the performance capability of the first ECU 36. The torque-scaling value has a maximum value of 1. For a first example, for a desired torque value of 5 N-m, a performance capability of 1 for the first ECU 36, and a performance capability of 0.25 for the second ECU 38 (such as because $V_{max} < V_{threshold}$ in the table above), the torque-scaling value for the first ECU 36 is 0.875. For a second example, for a desired torque value of 5 N-m, a performance capability of 1 for the first ECU 36, and a performance capability of 0 for the second ECU 38 (such as because of a fault code in the table above), the torque-scaling value for the first ECU 36 is 1. After the block 335, the process 300 proceeds to the block 340.

In the block 340, the first ECU 36 provides the output signal to the steering-system motor 34. The first ECU 36 attempts to provide an output signal with a value that is the product of the torque-scaling value and the desired torque value. If the torque-scaling values were not modified in the block 335, then the first ECU 36 provides one-half of the desired torque value to the steering-system motor 34. The values of the output signals will be less than the desired torque value weighted by the torque-scaling value if the first ECU 36 or second ECU 38 has a reduced performance capability. The value of the output signal for each of the ECUs 36, 38 is equal to approximately the product of the desired torque value, the respective performance capability, and the respective torque-scaling value, up to a maximum value, e.g., 3 N-m. The maximum value may be a physical property of the first and second ECUs 36, 38. If the value of the output signal would be greater than the maximum value, e.g., 4.375 N-m, the first ECU 36 instead provides an output signal equal to the maximum value. Continuing the first example from the block 335, for a torque-scaling value of 0.875, the calculated output signal of the first ECU 36 has a value of 0.875*1*5 N-m=4.375 N-m, the value of the output signal of the first ECU 36 would in fact be 3 N-m, and the value of the output signal of the second ECU 38 would be 0.5*0.25*5 N-m=0.625 N-m, for a combined output signal of 3.625 N-m. The combined output signal has a value of 3.625 N-m, which is greater than the value of the combined output signal of 3.125 N-m without modified torque-scaling values and closer to the desired torque value of 5 N-m. The output signals cause the steering-system motor 34 to actuate with a torque of approximately 3.625 N-m, and the steering system 48 thus changes the steering angle of the road wheels 52. Continuing the second example from the block 335, for a torque-scaling value of 1, the calculated output signal of the first ECU 36 has a value of 1*1*5 N-M=5 N-m, the value of the output signal of the first ECU 36 would in fact be 3 N-m, and the value of the output signal of the second ECU 38 would be 0.5*0*5 N-m=0 N-m, for a combined output signal of 3 N-m, which is greater than the combined output signal of 2.5 N-m without modified torque-scaling values and closer to the desired torque value of 5 N-m. The output signals cause the steering-system motor 34 to actuate with a torque of approximately 3 N-m, and the steering system 48 thus changes the steering angle of the road wheels 52. After the block 340, the process 300 ends.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A system comprising:
   a steering-system motor;
   a first electronic control unit (ECU) and a second ECU each electrically connected to the steering-system motor;
   a communication line directly communicatively connecting the first ECU and the second ECU; and
   a gateway module communicatively connecting the first ECU to a controller area network (CAN) bus and communicatively connecting the second ECU to the CAN bus;
   wherein the first ECU is programmed to:
      upon detecting a fault, transmit a fault code to the second ECU via the communication line and via the gateway module; and
      upon determining a desired torque value, provide one-half of the desired torque value to the steering-system motor upon determining that both ECUs have a full performance capability;

the second ECU is programmed to, upon detecting a fault, transmit a fault code to the first ECU via the communication line and via the gateway module;

a fault code from one of the first or second ECUs indicates that that ECU has a reduced performance capability; and the reduced performance capability is a fractional performance capability that is less than one and greater than zero.

2. The system of claim 1, wherein the second ECU is programmed to, upon determining a desired torque value, provide one-half of the desired torque value to the steering-system motor upon determining that both ECUs have a full performance capability.

3. The system of claim 1, wherein the first ECU is further programmed to provide more than one-half of the desired torque value to the steering-system motor upon determining that the second ECU has a reduced performance capability.

4. The system of claim 3, wherein the first ECU is further programmed to calculate a torque-scaling value for the first ECU, and provide the torque-scaling value multiplied by the desired torque value to the steering-system motor upon determining that the second ECU has a reduced performance capability, wherein the torque-scaling value compensates for the reduced performance capability of the second ECU.

5. The system of claim 4, wherein the torque-scaling value has a maximum value of 1.

6. The system of claim 4, wherein the torque-scaling value equals a difference of 1 and a product of one-half and the reduced performance capability of the second ECU, divided by the performance capability of the first ECU.

7. The system of claim 3, wherein the second ECU is further programmed to provide more than one-half of the desired torque value to the steering-system motor upon determining that the first ECU has a reduced performance capability.

8. The system of claim 3, wherein a temperature of the second ECU above a temperature threshold indicates a reduced performance capability.

9. The system of claim 3, wherein a maximum voltage from a terminal of the second ECU below a voltage threshold indicates a reduced performance capability.

10. The system of claim 1, wherein the steering-system motor is a six-phase electric motor.

11. The system of claim 10, wherein the first ECU is electrically connected to a set of three coil pairs of the steering-system motor, and the second ECU is electrically connected to a set of the other three coil pairs of the steering-system motor.

12. The system of claim 1, wherein the steering-system motor is a steer-by-wire torque actuator.

13. The system of claim 1, wherein the steering-system motor is an electric power-assist steering motor.

14. The system of claim 1, wherein the communication line is an intermicrocommunications line.

15. A system comprising:
a steering-system motor;
a first electronic control unit (ECU) and a second ECU each electrically connected to the steering-system motor;
a communication line directly communicatively connecting the first ECU and the second ECU; and
a gateway module communicatively connecting the first ECU to a controller area network (CAN) bus and communicatively connecting the second ECU to the CAN bus;

wherein the first ECU is programmed to:
upon detecting a fault, transmit a fault code to the second ECU via the communication line and via the gateway module, a fault code from one of the first or second ECUs indicating that that ECU has a reduced performance capability;
upon determining a desired torque value, provide one-half of the desired torque value to the steering-system motor upon determining that both ECUs have a full performance capability; and
provide more than one-half of the desired torque value to the steering-system motor upon determining that the second ECU has a reduced performance capability;

the second ECU is programmed to, upon detecting a fault, transmit a fault code to the first ECU via the communication line and via the gateway module; and a temperature of the second ECU above a temperature threshold indicates a reduced performance capability.

16. A system comprising:
a steering-system motor;
a first electronic control unit (ECU) and a second ECU each electrically connected to the steering-system motor;
a communication line directly communicatively connecting the first ECU and the second ECU; and
a gateway module communicatively connecting the first ECU to a controller area network (CAN) bus and communicatively connecting the second ECU to the CAN bus;

wherein the first ECU is programmed to:
upon detecting a fault, transmit a fault code to the second ECU via the communication line and via the gateway module, a fault code from one of the first or second ECUs indicating that that ECU has a reduced performance capability;
upon determining a desired torque value, provide one-half of the desired torque value to the steering-system motor upon determining that both ECUs have a full performance capability; and
provide more than one-half of the desired torque value to the steering-system motor upon determining that the second ECU has a reduced performance capability;

the second ECU is programmed to, upon detecting a fault, transmit a fault code to the first ECU via the communication line and via the gateway module; and a maximum voltage from a terminal of the second ECU below a voltage threshold indicates a reduced performance capability.

17. A system comprising:
a steering-system motor;
a first electronic control unit (ECU) and a second ECU each electrically connected to the steering-system motor;
a communication line directly communicatively connecting the first ECU and the second ECU; and
a gateway module communicatively connecting the first ECU to a controller area network (CAN) bus and communicatively connecting the second ECU to the CAN bus;

wherein the first ECU is programmed to, upon detecting a fault, transmit a fault code to the second ECU via the communication line and via the gateway module;

the second ECU is programmed to, upon detecting a fault, transmit a fault code to the first ECU via the communication line and via the gateway module;

the steering-system motor is a six-phase electric motor;

the first ECU is electrically connected to a set of three coil pairs of the steering-system motor; and the second ECU is electrically connected to a set of the other three coil pairs of the steering-system motor.

\* \* \* \* \*